United States Patent [19]

Desprez et al.

[11] Patent Number: 4,604,123
[45] Date of Patent: Aug. 5, 1986

[54] PROCESS AND INSTALLATION FOR HEATING A CHANNEL CONTAINING GLASS BY MEANS OF OXYFUEL FLAMES

[75] Inventors: Marc Desprez, Courbevoie; Serge Laurenceau, Versailles, both of France

[73] Assignee: L'Air Liquide, Societe Anonyme pour l'Etude et l'Exploitation des Procedes Georges Claude, Paris, France

[21] Appl. No.: 752,157

[22] Filed: Jul. 3, 1985

[30] Foreign Application Priority Data

Jul. 4, 1984 [FR] France ................................ 84 10597

[51] Int. Cl.$^4$ ............................................. C03B 5/225
[52] U.S. Cl. ....................................... 65/134; 65/135; 65/337; 65/346
[58] Field of Search ................. 65/134, 135, 136, 337, 65/346

[56] References Cited

U.S. PATENT DOCUMENTS

| | | | |
|---|---|---|---|
| 1,582,132 | 4/1926 | Delacuvellerie | 65/98 |
| 3,129,930 | 4/1964 | Labat-Camy | 263/15 |
| 3,523,781 | 7/1970 | Leveque | 65/134 |
| 3,837,832 | 9/1974 | Pecoraro et al. | 65/27 |

FOREIGN PATENT DOCUMENTS

| | | |
|---|---|---|
| 2022539 | 7/1970 | France . |
| 2220480 | 3/1973 | France . |
| 2350309 | 5/1976 | France . |

*Primary Examiner*—Arthur Kellogg
*Attorney, Agent, or Firm*—Lee C. Robinson, Jr.

[57] ABSTRACT

A process and installation for heating a channel in which flows a mass of molten glass toward one or more forming machines. The channel includes a vault which carries at least one group of oxyfuel burners connected to a source of oxygen and to a source of fuel gas, these burners being so oriented as to produce curtains of flames directed towards the longitudinal marginal zones of the surface of the stream of molten glass.

7 Claims, 3 Drawing Figures

PROCESS AND INSTALLATION FOR HEATING A CHANNEL CONTAINING GLASS BY MEANS OF OXYFUEL FLAMES

The present invention relates to a process and an installation for heating a molten glass supply channel or feeder in which flows a mass of molten glass to one or more forming machines.

A continuous glass fabricating line comprises in succession a composition shop in which the raw materials are mixed, these materials being introduced in the melting furnace, then a fore-basin in which the molten glass flows for the purpose of being subjected to a degassing, and then one or more channels connected to the forming machines. These channels have two functions, namely to convey the molten glass and to condition the glass as concerns temperature.

The molten glass is conveyed by gravity and its flow is at low velocity, on the order of a few meters per hour.

The conditioning of the glass as to temperature is the most important function of the connecting channel: it is that which permits the fabrication of a product of high and regular quality. This conditioning function comprises in particular three sub-functions:

(a) Modification of the temperature of the molten glass: usually by a cooling of the glass from the temperature of the furnace to the forming temperature (in some cases re-heating).

(b) Homogenization of the temperature of the glass so as to limit the transverse and vertical temperature gradients.

(c) Regulation of the temperature of the glass supplied to the forming machines.

The first sub-function may be achieved in two different ways:

(1) The glass is violently cooled for a short period of time and then it is allowed to become homogenized as to temperature. This method requires internal cooling means (ventilation, circulation of water) which reduce the effective efficiency of the heating equipment installed for maintaining a sufficient temperature level in the channel. Moreover, this method requires a certain knowledge of the flows of glass in the channel so as to avoid excessive transverse temperature gradients.

(2) The glass is cooled continuously and very slowly and in this method a natural cooling due to losses through the walls of the channel are solely employed.

In order to accomplish the second sub-function, namely the homogenization of the temperature of the glass, the marginal zones of the upper surface of the stream of glass must be re-heated since the outer layers of this stream of glass cool much more rapidly than the heart of the glass owing to the fact that the glass is a good insulator and that in a mass of glass, even when it is hot, the transfers of heat are of low value. The burners employed for re-heating the marginal zones of the stream of glass are usually fed from a feeder containing a premixture of cold air and gas fuel which presents a certain danger in the event of the flame being extinguished.

In order to perform the third sub-function which is necessary for obtaining a constant quality of the finished product, the channel has a plurality of successive zones the heating of which is piloted or controlled in an overall manner with a single temperature sensor.

The prior methods employed for performing the three aforementioned functions have a number of drawbacks, namely:

(a) A poor thermal efficiency of the flame employing cold air.

(b) A practical difficulty to insure the preferential heating of the marginal zones of the stream of glass flowing in the channel.

(c) A risk of explosion in the feeder connected to the burners resulting from the use of an air/gas fuel premixtuxe.

(d) Difficulties in precisely regulating the air/gas fuel ratio resulting in incomplete and inefficient combustions.

(e) Difficulties in responding, by means of present flame heating means, to a sudden variation in the operating conditions of the furnace which has led glass makers to the use of electricity for the partial or complete heating of the channel by direct eddy currents within the bath of glass.

U.S. Pat. No. 3,129,930 describes equipment for heating baths of molten glass. The bath is heated with burners spaced along the furnace, these burners being for example oxyfuel burners. Such an arrangement of burners does not meet the specific problem of feeding glass channels whose temperature profile must be controlled.

More recently, U.S. Pat. No. 3,523,871 deals with the problem of the temperature homogeneity of the glass in a feeder, and in particular the temperature homogeneity in a transverse plane on the surface of the stream of glass.

The solution given in the '871 patent for solving this problem consists in heating the channel or feeder with sources of heat (for example burners) which extend through the lateral walls of the feeder, this heat being, on one hand, directed to the channel roof or vault which radiates it over the bath of molten glass and, on the other hand, directed onto the lateral zones of the channel.

In practice, such a solution is expensive since the direct heating of the vault results in an accelerated aging and requires frequent changing of the vaults.

Further, the presence of heating means such as burners in the lateral walls of the channel did not permit the obtainment of a good homogeneity of the temperature profiles along the channel since the insulation of the lateral walls of the channel or feeder is difficult in the region of the openings for the passage of said burners.

More recently, French Pat. Nos. 2,022,539, 2,220,480 and 2,350,309 have attempted to solve the same problem by different artifices consisting in providing a special geometry of the vault of the furnace or an additional electric heating in the lateral zones of the channel.

None of the solutions proposed up to the present time enables this problem to be solved simply.

The process according to the invention avoids the aforementioned drawbacks and solves the considered problem.

For this purpose, in the process according to the invention for heating a channel in which flows a stream of molten glass to one or more forming machines, the longitudinal marginal zones of the upper surface of the stream of glass are heated by means of curtains of flame issuing from oxyfuel burners and directed towards these marginal zones.

The process and installation according to the invention have several advantages over known processes. First of all, a substantial improvement in the thermal efficiency of the flame is obtained owing to the use of oxyfuel burners, bearing in mind the reduction, and even the elimination, of the nitrogen ballast provided by the air of combustion. There is a decrease in the thermal losses through the fumes and consequently a great saving in the consumption of energy. Further, the rise in the temperature of the flame results in a distinct increase in the direct transfer of heat between the flame and the glass by radiation and convection with creation of disassociated elements which liberate heat by recombination upon contact with the surface of the stream of hot glass.

Moreover, the factor is increased owing to the fact that the burners provide a mixture at the nose of the burner, and the ratio between the oxygen and the gas is very easily regulated so that there is an optimization of the combustion. Further, the arrangement of the burners in the channel avoids all the problems relating to the behavior of the refractories constituting the super-structure of this channel and to the thermal insulation of the lower part of the channel and fully benefits from the improvement in the convective transfers resulting from the use of pure oxygen.

The gist of the invention is to effect the heating in the vault of the channel by means of curtains of flame coming from the center of the vault and inclined towards the marginal zones of the channel. There is observed, on the one hand, an improvement in the thermal transfer by directing the flame onto the charge and, on the other hand, a simplified thermal insulation of the lateral walls. In practice, the combustion of the gases must be terminated at the point of impact when the flame encounters the glass. Further, the vault must be provided with at least one opening per curtain of flames so as to allow the escape of the fumes. These openings must be disposed in such manner that the path of the gases in the enclosure is as long as possible to facilitate thermal exchanges so that the temperature of the fumes emitted does not exceed by more than 50° C. (and preferably 20° C.) the temperature of the bath of molten glass in the center of the channel.

The heating must be effected with divergent flames from the center towards the lateral edges of the channel. This permits great simplicity of the arrangement (a single burner), an easy relative equilibrium of the flames, and a good heat transfer bearing in mind the fact that the flames are inclined above the bath.

According to a first preferred manner of carrying out the invention, the process is characterized in that the end of each flame of the oxyfuel burner is located in proximity to the surface of the stream of molten glass. The vertical distance h between the end of the burner from which the flame emerges and the surface of the stream of molten glass is substantially equal to the horizontal distance d between the end of each flame and the vertical through said end of the burner, and the width L of the channel and the distance d are related by the following relation:

$$L/3 \leq 2d \leq 4L/5$$

According to another preferred manner of carrying out the invention, the process is characterized in that the oxyfuel burner is placed at a distance from the surface of the bath of molten glass which is such that the impact of each flame on the bath occurs when all the gases of the flame are burned. The point of impact is defined as the point corresponding to a temperature of the molten glass equal to $$\frac{T1 + \alpha T2}{\alpha + 1},$$

on the transverse temperature profile curve of the molten glass in the same channel before the oxyfuel burner has been placed in position, T1 being the maximum temperature of the glass in the channel, T2 being the minimum temperature in the channel and $\alpha$ a coefficient which varies substantially linearly from 2 to 5 according to the glass flow in the channel, $\alpha$ being in the neighbourhood of 2 at high flows and in the neighbourhood of 5 at low flows.

It will be understood that, as the channel is usually substantially symmetrical, the burner will preferably be placed in the plane of symmetry and the flames will be disposed symmetrically relative to this plane. But this does not exclude having different inclinations between different flames of the same row so as to "sweep" each lateral zone of the channel. Another object of the invention is to provide an installation for heating a channel in which flows a stream of molten glass to one or more forming machines, wherein the vault of the channel carries at least one group of oxyfuel burners connected to a source of oxygen and to a source of fuel gas, these burners being oriented in such manner as to produce curtains of flames directed towards the longitudinal marginal zones of the upper surface of the stream of molten glass.

There will now be described by way of non-limiting examples various embodiments of the invention with reference to the accompanying drawing in which.

Figure 1:
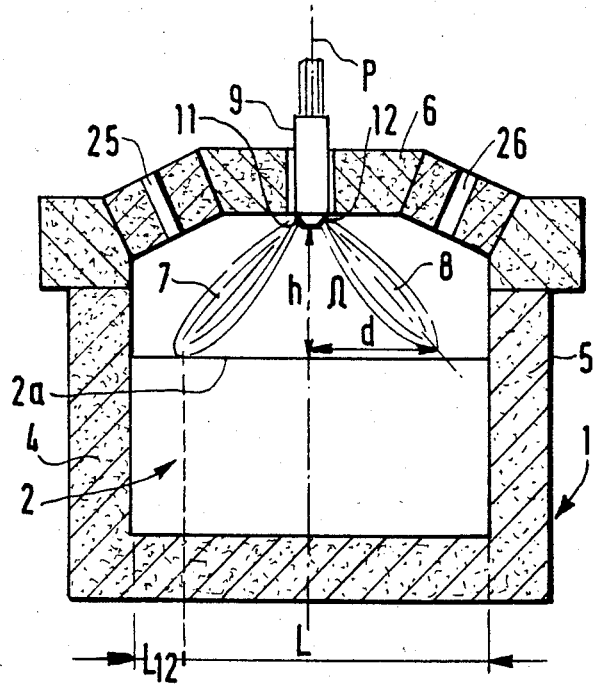
FIG. 1 is a diagrammatic vertical cross sectional view of a transfer channel of a stream of molten glass provided with a heating installation according to the invention.
Figure 2:
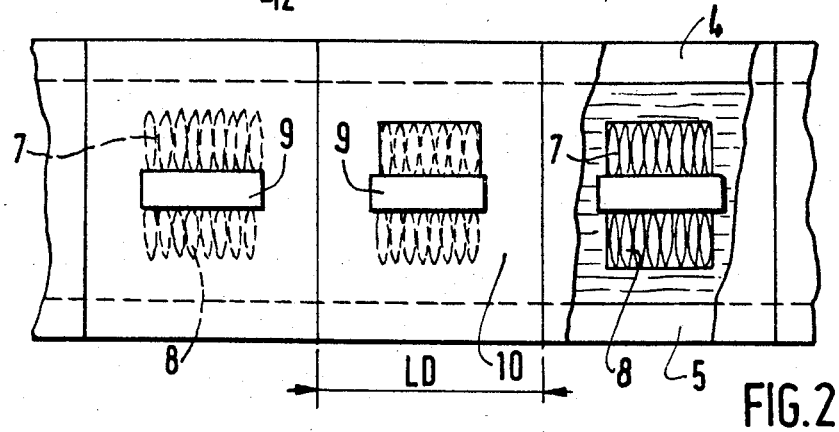
FIG. 2 is a diagrammatic plan view of the channel of FIG. 1.

FIGS. 1 and 2 show an installation for heating a channel or feeder 1 in which flows a stream of molten glass 2 coming from a melting furnace and flowing in the direction of one or more forming machines located on the downstream side of the channel. This channel 1 has a U-shaped cross section of width L. It comprises a sole, vertical walls 4 and 5 and it is closed in the upper part by a vault 6, all these elements being of a refractory material.

For the purpose of conditioning the stream of glass 2 so as to render its temperature as homogeneous as possible, the longitudinal marginal zones of the upper surface 2a of the stream of glass 2 is heated by means of two curtains of flame 7, 8 directed towards these zones.

In the embodiment illustrated in FIGS. 1 and 2, these two curtains of flames 7, 8 are produced by a rack 9 of burners 11, 12, this rack 9 being mounted vertically and longitudinally in the central part of the vault 6.

The angle $\Omega$ of inclination from the vertical of the two curtains of flames 7, 8 is defined by the structure of the burners 9. The point of impact of the curtains of flames 7, 8 on the upper surface 2a of the stream of molten glass 2, i.e., the distance d in FIG. 1 may be varied. The regulation is accomplished as before. Further, two exhaust flues 25 and 26 are provided for the smoke or fumes, each one being disposed in the presently-described embodiments substantially above the point of impact of the flames on the glass.

FIG. 2 illustrates a succession of burners disposed along the glass feeder channel in a plurality of cells. In practice, one burner per cell is provided. Each burner is spaced from the following burner a distance substantially equal to its length (about 30 cm). Watercooled burners are used which extend into the enclosure with a small clearance between the burner and the burner opening in the vault.

Figure 3:
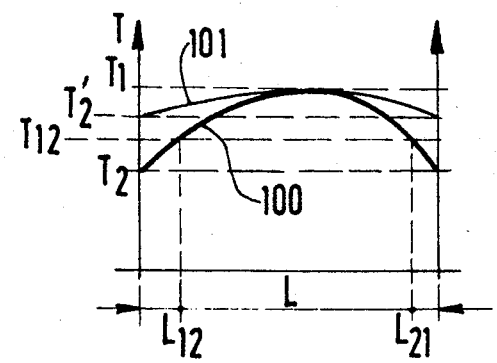
FIG. 3 shows a transverse temperature profile of the channel before and after using the process according to the invention.

FIG. 3 shows a temperature profile with and without the use of the process according to the invention. The curve 100 represents the transverse temperature profile of the channel or feeder which is desired to be modified according to the invention and heated with its conventional means. This curve 100 is well-known for each glass furnace channel or feeder. T2 is the minimum temperature close to the edges, T1 is the maximum temperature close to the center. For more details concerning these temperature profiles, see, for example, French Pat. No. 2,220,480). Bearing in mind the glass flow in the channel, there is applied a coefficient $\alpha$ proportional to the flow so as to correct the influence of the flow in the determination of the point of impact of the flames. For the maximum flow of the feeder, the coefficient $\alpha$ will be equal to 2 and for the minimum flow of the feeder (under the usual conditions of use), the coefficient $\alpha$ will be equal to 5, $\alpha$ varying linearly between these two values as a function of the flow. There is thus determined a temperature $$T12 = \frac{T1 + \alpha T2}{\alpha + 1}$$

as a function of the chosen coefficient $\alpha$.

The curve 100 permits the determination of the abscissae L12 and L21 of the points of impact of the curtains of flames, these points of impact being approximately symmetrical with respect to the plane P (FIG. 1). The heating of the feeder according to the process of the invention results in a temperature profile represented by the curve 101 whose minimum temperature T'2 is higher than T2. Thus the temperature profile is improved in the desired manner with simple means.

We claim:

1. A process for heating a vaulted channel in which flows a stream of molten glass in the direction of at least one forming machine, comprising heating longitudinal marginal zones of an upper surface of the stream of glass by means of curtains of flames which issue from oxyfuel burners and are directed from approximately the middle of the vaulted channel towards said marginal zones, and maintaining the direction of all of the flames within the channel away from the channel vault to thereby prevent the direct heating of said vault by said flames, said flames terminating at the point of impact with the glass.

2. A process according to claim 1, comprising locating the end of each flame of the oxyfuel burner in proximity to the surface of the stream of molten glass, the distance from the end of the burner from which the flame issues to the surface of the stream of molten glass being substantially equal to the distance d between the end of each flame and the vertical passing through said end of the burner, the width L of the channel and distance d being related by the relation:

$$L/3 \leq 2d \leq 4L/5$$

3. A process according to claim 1, comprising placing the oxyfuel burner at a distance d from the surface of the bath of molten glass which is such that the point of impact of each flame on said bath occurs when all the gases of the flame have been burnt, said point of impact being defined as the point corresponding to a temperature of the molten glass equal to $$\frac{T1 + \alpha T2}{\alpha + 1},$$

on the transverse temperature profile curve of the molten glass in the same channel before the burner is placed in position, T1 being the maximum temperature of the glass in the channel, T2 the minimum temperature in the channel and $\alpha$ a coefficient which varies substantially linearly from 2 to 5 depending on the glass flow in the channel, $\alpha$ being in the neighbourhood of 2 at high flows and in the neighbourhood of 5 at low flows.

4. A process according to claim 1, wherein the channel is substantially symmetrical with respect to a vertical plane parallel to the direction of forward flow of the molten glass, the burner being disposed in the plane of symmetry and the curtains of flames being disposed symmetrically with respect to said plane.

5. An installation for heating a channel in which flows a stream of molten glass in the direction of at least one forming machine, said channel comprising a vault, at least one group of oxyfuel burners carried by said vault and connected to a source of oxygen and to a source of fuel gas, said burners being oriented in such manner as to produce curtains of flames directed from approximately the middle of the vaulted channel towards longitudinal marginal zones of an upper surface of the stream of molten glass, said flames terminating at a point of impact with the glass, and means defining at least one opening associated with each curtain of flames, said opening having such dimensions that an overpressure of gas of a few millimeters of water is maintained above the molten glass so as to avoid entry of air.

6. An installation according to claim 5, comprising a rack of burners carried by said vault and connected to fuel and oxygen sources, said burners being inclined at the same angle with respect to the longitudinal and vertical plane of symmetry of the rack and divided into two groups which are symmetrical to each other with respect to said longitudinal and vertical plane.

7. An installation according to claim 6, wherein the rack of burners is placed at a height from the upper surface of the stream of molten glass which is adjustable.

* * * * *